April 4, 1961 — L. C. PEARCH — 2,978,185
AIR BLAST SPRAYER
Filed March 24, 1958 — 2 Sheets-Sheet 1
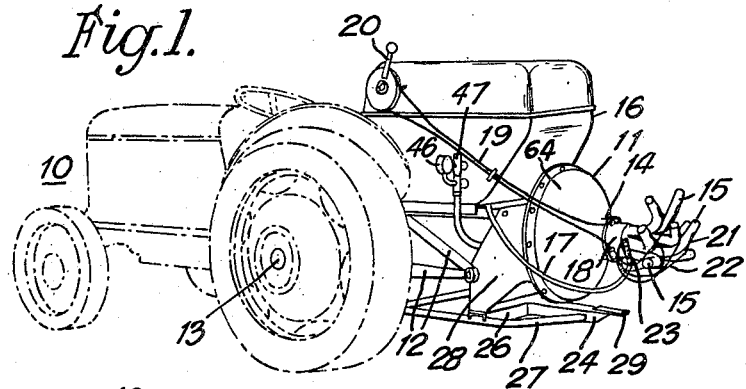
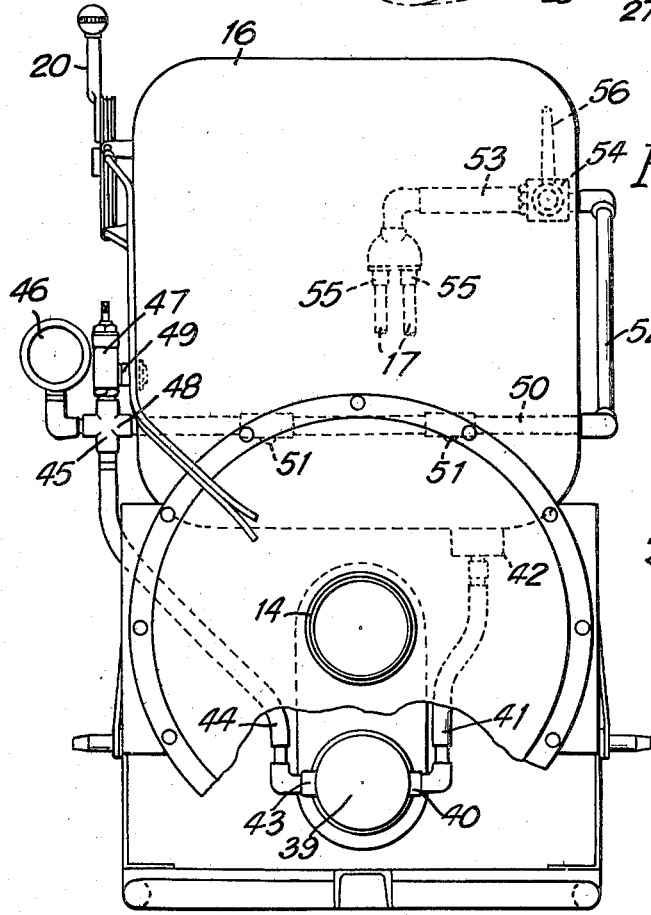
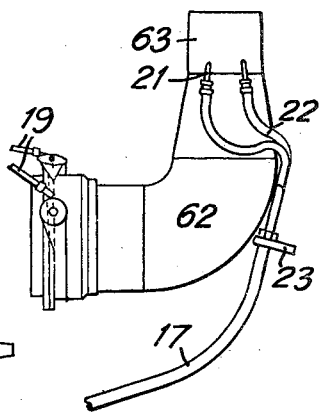
INVENTOR
Leonard C. Pearch
By Shoemaker & Mattare
ATTORNEYS April 4, 1961 L. C. PEARCH 2,978,185
AIR BLAST SPRAYER Filed March 24, 1958 2 Sheets-Sheet 2

INVENTOR
Leonard C. Pearch
By Shoemaker & Mattare
ATTORNEYS

United States Patent Office 2,978,185
Patented Apr. 4, 1961

2,978,185
AIR BLAST SPRAYER
Leonard Charles Pearch, Cokehurst, Gallants Lane, East Farleigh, Kent, England
Filed Mar. 24, 1958, Ser. No. 723,489
Claims priority, application Great Britain Mar. 27, 1957
3 Claims. (Cl. 239—77)

This invention relates to means for spraying liquid insecticides and the like by air blast for agricultural and horticultural purposes.

Spraying machines for these purposes are well known, for example in the form of trailers for use with tractors, a power-driven fan mounted upon the trailer delivering a current of air into which the liquid is atomized, and the spray-laden air being directed upwardly or laterally through one or more outlets.

The invention has for its main object to provide air blast spraying means in the form of a self-contained unit or assembly which can be attached directly to a tractor or like power-driven machine, the unit or assembly being supported wholly by said tractor or like machine.

Another object of the invention is to provide an attachment of this character in which the fan is mounted in a casing provided with means for securing it to the rear of the tractor or like machine, the fan having its shaft arranged longitudinally in relation to the latter, and the air from the fan being delivered rearwardly into a rotatable socket carrying one or more outlets which can be turned as desired for directing the spray-laden air.

Other objects and advantages of the invention will hereinafter appear from the following description given with reference to the accompanying drawings, in which:

Fig. 1 is a perspective view of a tractor having the air blast sprayer attachment fitted thereto.

Fig. 5 is a side view of a single air discharge pipe which may be fitted at the rear of the attachment shown in Fig. 2.

Figure 2:
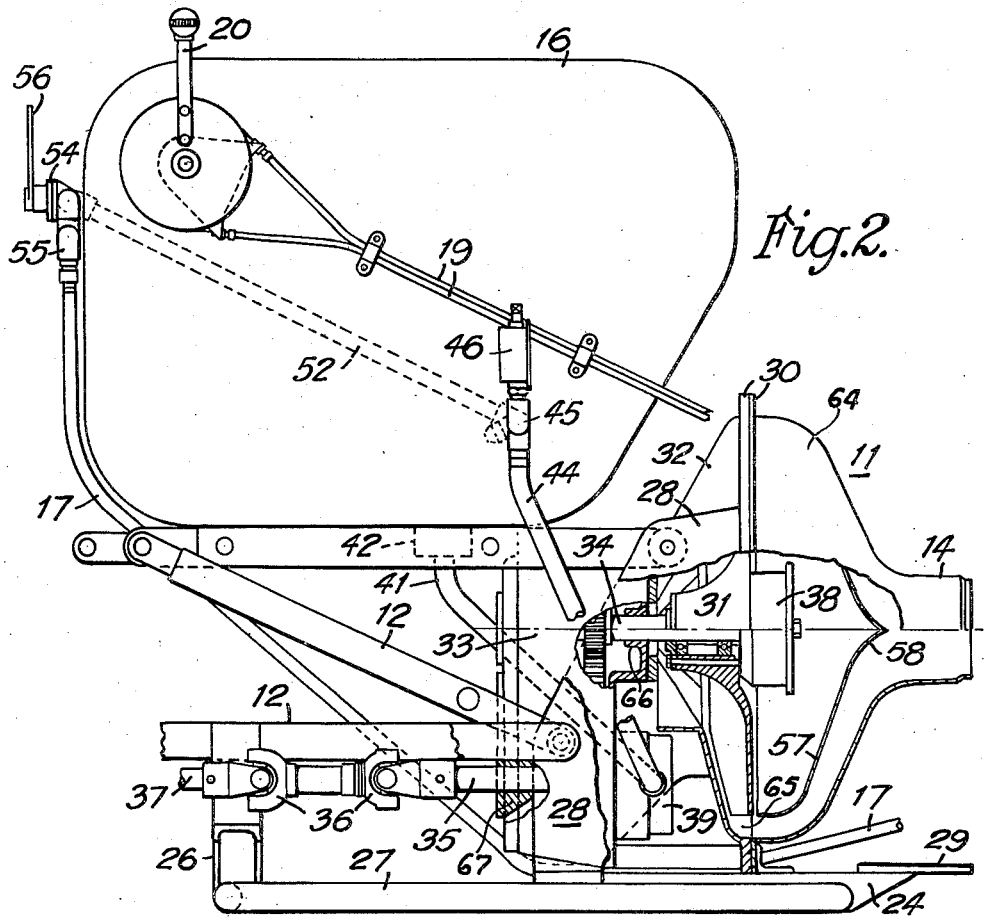
Fig. 2 is a part side elevation and Fig. 3 a rear view of the attachment alone.

Referring to Figs. 1 and 2 of the drawings, the tractor 10, which may be of any suitable type for agricultural work, is shown with an attachment comprising a fan 31 mounted in a casing 11 provided with links 12 for securing it to the rear axle 13 of the machine, the fan being driven from an extension of the driving worm at the back of the axle, or from the customary power take-off shaft; the fan casing has a central boss or hub 14 at its rear end leading to a number of pipes 15 for delivery of air at high speed. Forward of the fan casing, and at a higher level, there is mounted a tank 16 for containing a supply of the liquid to be sprayed, the liquid being conveyed by one or more pipes 17 to nozzles located in the air-delivery pipes 15. The liquid may be forced from the tank 16 by air pressure, so that the rate of flow is not dependent solely on the level of liquid in the tank, for which purpose air may be transmitted from the fan casing 11 to the tank 16 by suitable means (not shown); preferably, however, the liquid is delivered to nozzles or pipes 21 by means of a pump 39, as hereinafter described.

The casing boss or hub 14 is fitted with a socket 18 rotatable thereon and having several pipes 15 projecting at divergent angles, the rotation of the socket being controlled through Bowden wires 19 or the like by a handle 20 arranged near the top of the tank 16 conveniently for operation by the driver of the tractor; the delivery may thus take place upwardly, laterally or at an inclination to either side of the vertical, as may be desired.

Figure 4:
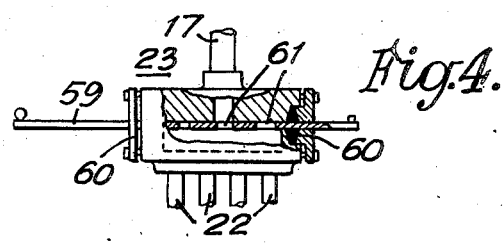
Fig. 4 is a detail of a metering device.

Attached to the rotatable socket 18 are a number of small pipes 21 extending into the pipes 15, substantially radially thereof, to act as nozzles for the liquid; the nozzles may consist merely of the cut-off ends of the pipes 21, delivering in a substantially radial direction into the pipes 15. The pipes 21 are connected externally by flexible hoses 22 to two junction pieces 23 to which the pipes 17 on opposite sides of the machine are connected; each junction piece may be associated with a shut-off valve 54, or arranged as a metering device (as seen in Fig. 4) to regulate the discharge.

The fan casing rests upon a channel-section frame member 24 extending along or parallel to the centre line of the tractor, and another channel-section frame member 26 extending at right angles to the first, these two members being connected rigidly together with tubular members 27 welded or otherwise secured thereto; two side plates 28, bolted to the ends of the member 26 and to the rim of the fan casing 11, are secured by the outer divergent links 12 on the respective sides to fixing points on the rear axle of the tractor, while an inner link extends from near the top of the fan casing to another point on the axle, thus completing a three-point linkage for the attachment, which is thereby supported wholly by the tractor. The channel-section member 24 is provided at its rear end with a draw-bar 29 for connection of a trailer, if desired, for example one carrying a reserve supply of liquid for refilling the tank 16.

As shown in Fig. 2, the fan casing 11 is made in two parts 32, 64, of shallow conical or bell-mouthed shape, connected by circumferential flanges 30, the two parts forming a chamber enclosing on one side a centrifugal fan 31 of radial delivery type. The front part 32 of the casing, which has one or more openings 65 to allow entry of air to the fan chamber, is bolted to a gearbox 33 having upper bearings 66 for the fan shaft 34 and lower bearings 67 for a primary shaft 35 connected by universal joints 36 to the power take-off shaft 37 of the tractor, the gearbox being arranged to drive the fan shaft 34 at about six or eight times the speed of the shaft 37. The fan shaft is fitted with a centrifugal clutch 38 for driving the fan runner only after a predetermined speed has been reached; this will permit the fan to continue revolving by inertia in the event of a sudden stoppage of the tractor and also allow the tractor to be driven at low speed, as in maneuvering, without operation of the fan. Alternatively, the drive may take place through a free-wheel device, to permit the fan runner to revolve when the tractor stops.

At the back of the gearbox, there is mounted a pump 39, for example of the roller vane or Rootes blower type, driven by the primary shaft 35; as seen in Fig. 3, the pump inlet 40 is connected by a pipe 41 to a draw-off fitting 42 at the bottom of the tank 16, and its delivery 43 is connected by a pipe 44 to a multi-way fitting 45 on the side if the tank, provided with a pressure gauge 46, a release valve 47 and two side-connections 48, 49. The lower connection 48 leads to a pipe 50 extending across the interior of the tank with one or more lateral nozzles 51 for agitating the liquid therein; the upper connection 49, controlled by the release valve 47, allows liquid to return into the tank when the pressure becomes excessive. The pipe 50 is continued outside the tank by an inclined pipe 52, connected to a short pipe 53 at the front, this pipe being fitted with a shut-off valve 54 controlling two branches 55 upon which the pipes 17 are connected; the shut-off valve 54 is provided with a handle 56 placed conveniently for operation by the driver of the tractor, so that the liquid may be delivered to the nozzles of the pipes 15 on either side or on both sides of the machine or the delivery stopped altogether, in which case the release valve 47 will open for return of the liquid into the tank. In this way, the liquid may be agitated to secure uniformity of the solution before starting the spraying operation; the pump may also be employed for filling the tank, for example from a reserve supply on a trailer, by providing a suction pipe connected to the pump inlet 40 through a two-way valve whereby the pipe 41 may be shut off.

The rear part 64 of the fan casing 11 encloses a stationary diaphragm 57 which guides the air from the periphery of the fan runner 31 inwardly to the central boss or hub 14, upon which the rotatable socket 18 is fitted, as already described. The diaphragm, which may consist of a thin sheet-metal pressing, is so shaped in relation to the adjacent wall of the casing that the passage between them gradually decreases in sectional area towards the center 58 of the diaphragm, which is of approximately conical shape adjacent to the hub 14; consequently, the air discharged at high speed from the periphery of the fan runner will be further accelerated as it flows towards the socket 18 on which the pipes 15 are mounted, the air being therefore delivered at very high speed for atomizing the liquid from the nozzles.

Fig. 4 shows one of the junction pieces 23 arranged as a metering device to regulate the discharge of liquid from the nozzles. In this device, a slide 59 passes through packing glands 60 in the opposite ends of the junction piece 23, the slide being provided with a row of holes 61 of different sizes, any one of which can be brought into register with connections to the external pipes 17, 22 by longitudinal adjustment of the slide 59 in order to vary the rate of discharge of liquid for atomization.

Fig. 5 shows an alternative form of air delivery pipe and spraying nozzles arranged upon a rotatable socket adapted for fitting upon the boss or hub 14 of the fan casing. In this modification, the socket comprises a round elbow 62 tapering to a single pipe 63 through the walls of which the small pipes 21 are led, delivering in a substantially radial direction into the pipe 63, there being four pipes 21 with their open inner ends terminating as nozzles at a distance from the axis of the pipe 63 equal for example to half the internal radius of the latter. The socket 62 can be rotated by means of Bowden wires or the like, as already described, so that the single pipe 63 may be made to deliver the spray-laden air current upwardly, laterally or at an inclination to either side of the vertical, as desired.

What I claim is:

1. An air blast sprayer attachment for a power-driven machine, said attachment comprising a fan, a casing for said fan, said casing being formed in two parts of shallow conical shape connected by circumferential flanges to provide a chamber enclosing said fan, linkage connecting said casing rigidly to the rear of the machine, a stationary diaphragm also enclosed in the chamber provided by said two-part casing, said casing having at least one axial outlet for delivery of air by said fan, said diaphragm guiding air from the periphery of said fan to said outlet, a rotatable member coaxial with said outlet, at least one spraying nozzle upon said rotatable member, means for turning said rotatable member by hand-control from said machine, a tank for liquid, pipe connections from said tank for conveying liquid to said nozzle, and means for driving said fan from a power shaft of said machine.

2. An air blast sprayer attachment for a power-driven machine, said attachment comprising a fan, a casing for said fan, a feed-multiplying gearbox secured to said casing, a frame supporting said casing and gearbox, a link system for connecting said frame rigidly to the rear of the machine, a coupling device for driving said gearbox from a power shaft of the machine, said gearbox driving said fan at a higher speed than the speed of said power shaft, said casing having at least one outlet for delivery of air by said fan, a rotatable member coaxial with said outlet, at least one spraying nozzle upon said rotatable member, means for turning said rotatable member by hand control from said machine, a tank for liquid, and pipe connections from said tank for conveying liquid to said nozzle.

3. An air blast sprayer attachment for a power-driven machine, said attachment comprising a fan, a casing for said fan, a speed-multiplying gearbox secured to said casing, a frame supporting said casing and gearbox, a link system for connecting said frame rigidly to the rear of the machine, a coupling device for driving said gearbox from a power shaft of the machine, said gearbox driving said fan at a higher speed than the speed of said power shaft, said casing having at least one outlet for delivery of air by said fan, a rotatable member coaxial with said outlet, at least one spraying nozzle upon said rotatable member, means for turning said rotatable member by hand control from said machine, a tank for liquid, a pump driven by said gearbox, a pipe from said tank for conveying liquid to said pump, and a pipe from said pump for conveying liquid to said nozzle.

References Cited in the file of this patent

UNITED STATES PATENTS

| | | |
|---|---|---|
| 2,281,229 | Bullock | Apr. 28, 1942 |
| 2,297,082 | Staats | Sept. 29, 1942 |
| 2,348,190 | Bullock | May 9, 1944 |
| 2,444,677 | Rosenblum | July 6, 1948 |
| 2,551,789 | Copley | May 8, 1951 |
| 2,583,560 | Gaddis | Jan. 29, 1952 |
| 2,763,426 | Erwin | Sept. 18, 1956 |
| 2,829,674 | Segelhorst et al. | Apr. 8, 1958 |